(12) United States Patent
Mayo et al.

(10) Patent No.: US 8,630,944 B2
(45) Date of Patent: Jan. 14, 2014

(54) CHARITABLE DONATION OF PROCEEDS FROM RECYCLING ACTIVITY

(75) Inventors: George A. Mayo, Scarborough, ME (US); George Clayton Kyle, Jr., Freeport, ME (US)

(73) Assignee: Count & Crush Systems, LLC, South Portland, MA (US)

( * ) Notice: Subject to any disclaimer, the term of this patent is extended or adjusted under 35 U.S.C. 154(b) by 0 days.

(21) Appl. No.: 13/192,899

(22) Filed: Jul. 28, 2011

(65) Prior Publication Data
US 2013/0030988 A1   Jan. 31, 2013

(51) Int. Cl.
*G06Q 40/00* (2012.01)
(52) U.S. Cl.
USPC ............................................. 705/39; 705/1.1
(58) Field of Classification Search
USPC ................................ 264/911, 918; 705/1, 1.1
See application file for complete search history.

(56) References Cited

U.S. PATENT DOCUMENTS

| | | |
|---|---|---|
| 4,829,428 A | 5/1989 | Weitzman et al. |
| 5,042,634 A | 8/1991 | Gulmini |
| 5,248,102 A | 9/1993 | Bohn |
| 5,249,689 A | 10/1993 | Wergeland et al. |
| 5,251,546 A | 10/1993 | Wergeland et al. |
| 5,462,153 A | 10/1995 | Friis |
| 5,464,976 A | 11/1995 | Scofield et al. |
| 5,484,995 A | 1/1996 | Scofield et al. |
| 5,522,311 A | 6/1996 | Horsrud et al. |
| 5,559,319 A | 9/1996 | Peng |
| 5,614,706 A | 3/1997 | Bard et al. |
| 5,628,408 A | 5/1997 | Planke et al. |
| 5,860,503 A | 1/1999 | Hanserud et al. |
| 5,934,440 A | 8/1999 | Kroghrud |
| 5,960,402 A | 9/1999 | Embutsu et al. |

(Continued)

FOREIGN PATENT DOCUMENTS

| | | |
|---|---|---|
| EP | 0 389 735 A1 | 10/1990 |
| EP | 1 247 583 A1 | 10/2002 |

(Continued)

OTHER PUBLICATIONS

International Search Report and Written Opinion for International Application PCT/US2006/002425 dated Jun. 7, 2006.

(Continued)

*Primary Examiner* — William Rankins
(74) *Attorney, Agent, or Firm* — Wolf, Greenfield & Sacks, P.C.

(57) ABSTRACT

Embodiments of the invention enable an organization to nominate itself to receive proceeds from consumer recycling activity. For example, some embodiments enable an organization to request that an account be established to which proceeds from recycling activity are to be directed. Upon the account being established, the organization may be provided with a set of receptacles (e.g., beverage container collection bags), which the organization may hand out to potential donors. Each receptacle may include an identifier that allows the account to be identified. Donors may collect recyclable beverage containers in his/her receptacle over time, and bring the receptacle to a return center when it becomes full, at a designated time (e.g., to meet a suggested deadline set by the organization), or at any other suitable time. The recyclable containers in the receptacle may be processed, and a value to be provided in exchange for the containers may be determined. Some or all of that value may be deposited to the organization's account, rather than being provided to the consumer.

23 Claims, 10 Drawing Sheets

(56) References Cited

U.S. PATENT DOCUMENTS

| | | | |
|---|---|---|---|
| 6,006,995 | A | 12/1999 | Amundsen et al. |
| 6,637,657 | B2 | 10/2003 | Barkau et al. |
| 6,648,227 | B2 | 11/2003 | Swartz et al. |
| 6,842,596 | B2 | 1/2005 | Morii et al. |
| 7,317,962 | B2 | 1/2008 | Whittier |
| 7,416,142 | B2 | 8/2008 | Baker et al. |
| 2003/0140828 | A1 | 7/2003 | Liu |
| 2003/0215260 | A1 | 11/2003 | Morii et al. |
| 2004/0148189 | A1 | 7/2004 | Stoffelsma |
| 2005/0080520 | A1 | 4/2005 | Kline et al. |
| 2005/0246225 | A1 | 11/2005 | Jorgensen |
| 2006/0163028 | A1 | 7/2006 | Hunscher |
| 2007/0174073 | A1 | 7/2007 | Hunscher et al. |
| 2008/0086411 | A1* | 4/2008 | Olson et al. ............ 705/39 |
| 2009/0024479 | A1* | 1/2009 | Gonen et al. ............ 705/14 |
| 2009/0138358 | A1* | 5/2009 | Gonen et al. ............ 705/14 |

FOREIGN PATENT DOCUMENTS

| | | |
|---|---|---|
| GB | 2 330 409 A | 4/1999 |
| WO | WO 00/44508 A2 | 8/2000 |
| WO | WO 02/089073 A2 | 11/2002 |

OTHER PUBLICATIONS

International Search Report and Written Opinion for International Application PCT/US2006/002128 dated May 23, 2006.
Tomra, "First Tomra Recycling Center Now Open in the U.K," News 2005/Jan. 2005, pp. 1-2 http://www.tomra.com/default.asp?V__DOC__ID=1341.
Tomra, "Recycling Centers," Products/Recycling Centers/Tomra Recycling Center, Retrieved Jun. 2, 2005, pp. 1-2 http://www.tomra.com/default.asp?V__DOC__ID=1341.
Tomra, "TOMRA Newsletter," Summer 2004, Tomra Systems ASA-Spring/Summer 2004, pp. 1, http://www.tomra.com/default.asp?V__DOC__ID=1341.
Tomra, "Return, Recycling News From TOMRA, Introducing: The TOMRA Recycling Center," Summer 2004, pp. 1-22.
Tomra, "TOMRA Newsletter," Tomra Systems ASA-TOMRA Newsletter, Retrieved Oct. 20, 2011, pp. 1, http://www.tomra.com/default.asp?V__DOC__ID=1341.
Tomra, "Return, Recycling News From TOMRA, Cutting the Cord TOMRA RVMs on the Airwaves," Winter, 2004, pp. 1-27.
Tomra, "Return, Recycling News from TOMRA" Winter 2002, http://www.tomra.com/default.asp?V__ITEM__ID=428.
Tomra, "Return, Recycling News from TOMRA" Winter 2001, http://www.tomra.com/default.asp?V__ITEM__ID=426.
Tomra, "Return, Recycling News from TOMRA" Spring/Summer 2001, http://www.tomra.com/default.asp?V__ITEM__ID=425.

* cited by examiner

Hannaford Community Cash

School Accounts

Master Account Name: _____

Sub Account Names:

Account Administrator: _____

Checks Made Out To: _____

Address to Mail Bags and Tags/Checks:

PLEASE INCLUDE THE NUMBER OF BAGS AND TAGS PER SUB-ACCOUNT YOU WOULD LIKE INCLUDED IN YOUR FIRST ORDER your available balance is

$60.05 ~505

Last pay slip: $5.00 on 2/21/2011 10:07:38 PM ~510

(may not reflect past 48 hrs)

Kyle Elementary School balance by sub account

| | |
|---|---|
| Classroom 2nd grade Mrs. Smith | $10.80 |
| Classroom 2nd grade Mr. Phillips | $6.20 |
| Classroom 3rd grade Mr. Jones | $25.30 |
| Classroom 3rd grade Ms. Johnson | $7.95 |
| Classroom 4th grade Mrs. Todd | $4.55 |
| Classroom 5th grade Mr. Williams | $5.25 |

Hannaford Community Cash

Community Cash Statement
12/1/2010 to 3/31/2011

| | Date | Qty | Description | Each | Amount |
|---|---|---|---|---|---|
| 710 | 11/30/10 | 1 | Beginning Balance | $62.05 | $62.05 |
| 720 | 01/03/11 | 100 | Community Cash Bags | $0.13 | ($13.00) |
| 730 | 01/25/11 | 1 | Online Community Cash gift from | $65.50 | $65.50 |
| 740 | 03/31/11 | 1 | 34 Bags processed from 12/01/2010 through 03/31/2011 | $128.00 | $128.00 |
| 750 | 04/01/11 | 1 | Community Cash Plan Fee | $4.95 | ($4.95) |
| 760 | 04/01/11 | 1 | Community Cash Check Disbursal | $237.60 | ($237.60) |
| | | | | Ending Balance | $0.00 |

4/7/2011 5:04:00 PM   Page 1

CHARITABLE DONATION OF PROCEEDS FROM RECYCLING ACTIVITY

FIELD

This invention relates to techniques for encouraging recycling activity and charitable donations.

BACKGROUND

Some states have enacted legislation (i.e., so-called "bottle bills") requiring that consumers pay a redemption deposit when purchasing beverages in certain types of containers. For example, some states impose redemption deposits of up to $0.15 for each can, bottle or other beverage container sold. The payment of a redemption deposit on a beverage container encourages the consumer to recycle the container, since the deposit is returned to the consumer when he/she brings the container to a return center for processing. In other states in which no redemption deposit is imposed by law, there have been extensive efforts to encourage consumers to voluntarily bring containers they have purchased to a return center for recycling.

At a return center, consumers may submit used beverage containers for recycling by, for example, feeding the containers individually to a reverse vending machine, providing them to an attendant, and/or dropping the containers off at a designated location. After containers are returned for recycling, the consumer may be provided value in exchange for the containers. For example, some reverse vending machines print a receipt for any containers returned, which the consumer may then exchange for legal tender (e.g., in the amount of the redemption deposit paid for the returned containers). If no redemption deposit was paid, then some other form of value may be provided to the consumer in exchange for the containers (e.g., coupons, store credits, "points," promotional offers, etc.).

Some conventional arrangements enable a consumer to donate some or all of an amount provided in exchange for returned containers to a charitable organization. For example, some conventional reverse vending machines provide consumers with the option of either receiving a receipt for the total value of containers returned, or directing some or all of that amount to a charitable organization that is nominated by the reverse vending machine's operator (e.g., by pushing a button on the reverse vending machine indicating a desire to have the amount donated to the organization). Some other, less formal arrangements allow the consumer to drop a receipt or legal tender received in exchange for returned containers into a donation jar for a designated charitable organization.

SUMMARY

Some embodiments of the invention allow an organization to nominate itself to receive proceeds from recycling activity. That is, rather than relying on a return center operator to designate the organization as one to which consumers may direct proceeds received from recycling activity, some embodiments of the invention allow an organization to "self-select" itself as such a recipient.

Providing this capability confers at least two benefits. First, it allows the organization to expand its population of potential donors, thereby increasing the total amount of donations received. In this respect, conventional arrangements which require that an organization be designated by the operator of a return center to receive proceeds from consumer recycling activity may boost the fundraising efforts of the organization(s) selected, but unnecessarily deny other organizations that are not selected by the operator access to potential donors. In contrast to the exclusivity that characterizes these conventional arrangements, some embodiments of the invention enable any organization to designate itself as one which may receive proceeds from consumer recycling activity, thereby increasing the organization's fundraising capabilities.

Second, allowing an organization to designate itself as a recipient of recycling proceeds can increase consumer recycling activity. In this respect, the inventors have recognized that certain consumers, who may not be sufficiently motivated to recycle when the only benefit to doing so is the return of their redemption deposit, become sufficiently motivated to recycle when they know that the redemption deposit will instead be donated to charity. Thus, some embodiments of the invention may encourage increased recycling activity, including by consumers that may not otherwise recycle at all. In addition, some embodiments of the invention described enable different organizations and/or groups within the same organization to compete against each other in encouraging consumers to donate and therefore to recycle. It is self-evident that increasing recycling activity benefits society as a whole.

Embodiments of the invention enable an organization designate itself as a recipient of proceeds from consumer recycling activity in any of numerous ways. In some embodiments of the invention, an organization may request that an account be established to which proceeds from consumer recycling activity are to be directed. After the account is established, the organization may be provided with a set of receptacles (e.g., beverage container collection bags), which may be handed out to potential donors. Each receptacle may include an identifier (e.g., printed on a tag that can be affixed to the receptacle, printed on the receptacle, etc.) that allows the organization's account to be identified. Each donor may collect recyclable beverage containers in his/her receptacle over time (e.g., as the donor consumes beverages in the normal course), and when the receptacle becomes filled with recyclable containers, the consumer may bring the receptacle to a return center so that the containers held therein may be recycled. Some or all of the value that would normally be provided to the consumer in exchange for the returned containers (e.g., redemption deposits) may instead be directed to the account established for the organization. Thus, embodiments of the invention may provide an organization with a capability to collect donations from consumers, without the consumers or the organization having to expend significant additional effort.

Some embodiments of the invention provide features that allow amounts deposited over time into an organization's account to be monitored, to provide security and accountability. For example, in some embodiments, a statement of activity relating to the account may be issued periodically (e.g., quarterly) to one or more designated representatives of the organization (e.g., the treasurer and/or president of a charity), allowing the representative(s) to track deposits over time, and providing transparency in accounting. Further, in some embodiments, amounts in the account may be distributed periodically (e.g., quarterly, at the time a statement is issued) by issuing a check made payable to the organization. Thus, embodiments of the invention may provide increased security relative to conventional arrangements wherein amounts collected are distributed to a lay individual as a designated representative of an organization, without the organization necessarily knowing how much was donated, or when.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 5 is a reproduction of a screen display showing donations to an organization's account, in accordance with some embodiments of the invention;

DETAILED DESCRIPTION

As noted above, some embodiments of the invention enable an organization to nominate itself to receive proceeds from consumer recycling activity. For example, some embodiments enable an organization to request that an account be established to which proceeds from recycling activity are to be directed. Upon the account being established, the organization may be provided with a set of receptacles (e.g., beverage container collection bags), which the organization may hand out to potential donors. Each receptacle may include an identifier that allows the account to be identified. Donors may collect recyclable beverage containers in his/her receptacle over time, and bring the receptacle to a return center when it becomes full, at a designated time (e.g., to meet a suggested deadline set by the organization), or at any other suitable time. The recyclable containers in the receptacle may be processed, and a value to be provided in exchange for the containers may be determined. Some or all of that value may be deposited to the organization's account, rather than being provided to the consumer.

Figure 1:
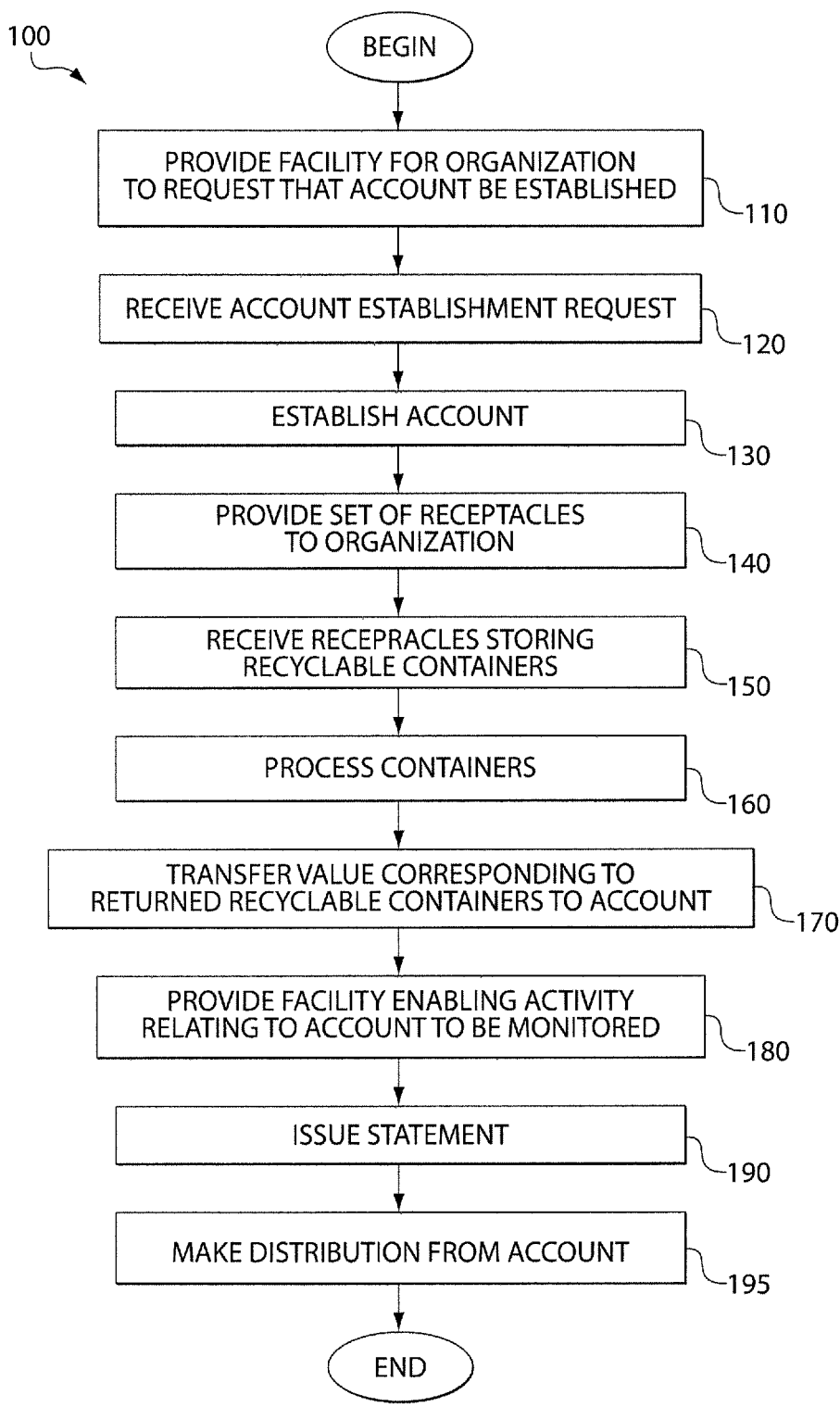
FIG. 1 is a flowchart depicting an example process whereby an organization may benefit from donor recycling activities, in accordance with some embodiments of the invention.

FIG. 1 depicts an example process 100 that may be performed to allow an organization to receive proceeds from donors' recycling activity. As used herein, the term "organization" denotes any entity, or any one or more individuals, that is organized to receive such proceeds. An organization may or may not comprise a charitable or not-for-profit entity, and may or may not include an immediate beneficiary for any proceeds that are donated. For example, an organization may be a scholarship fund, the recipient of which has not, as of the time of any donations, been identified. Other example organizations may, for example, include scholastic sports teams, academic institutions, classrooms and/or other student organizations, foundations, religious groups, public interest groups, and/or any other suitable entity types. Similarly, a "donor" need not be an individual, and may comprise any one or more people with a common interest in donating to a selected organization. For example, a donor may comprise a team of individuals, a business entity, a group of students and/or any other suitable collection of one or more individuals.

Figure 2:
FIG. 2 is a screenshot representation of a facility enabling an organization to establish an account to which donors may direct proceeds from recycling activities, in accordance with some embodiments of the invention.

At the start of process 100, a facility is provided in act 110 for the organization to request that an account be established to which proceeds from recycling activity (e.g., redemption deposits, or other proceeds) may be directed. The facility may be implemented in any of numerous ways. In some embodiments of the invention, an online facility may provide a sign-up form that may be filled out by an organization's representative and submitted to request that an account be established. An example online facility 200 is shown in FIG. 2. The example facility 200 shown allows a representative to supply the organization's name in field 205, the first and last name of its treasurer in fields 210 and 215, respectively, the first and last name of another organization officer in fields 220 and 225, respectively, the organization's street address, city, state and ZIP code in fields 230, 235, 240 and 245, respectively, its telephone number in field 250, and its email address in fields 255 and 260. Example online facility 200 enables the representative to specify the answer to a security question in field 265, so that the account may be accessed by authorized individuals (as described further below with respect to FIG. 6). The representative may indicate whether they are a §501(c)(3) "exempt" organization in box 270, and indicate agreement with terms of service via box 275. Button 280 allows the sign-up form to be submitted for review and consideration (e.g., by an administrator). It should be appreciated that online facility 200 provides merely one example of a sign-up form to be submitted online, and that numerous variations (e.g., including different fields, boxes and/or buttons than are shown in FIG. 2) are possible. Embodiments of the invention may be implemented in any of numerous ways.

Figure 3:
FIG. 3 is a reproduction of a form which an organization may use to establish an account to which donors may direct proceeds from recycling activities, in accordance with some embodiments of the invention.

Embodiments of the invention are not limited to establishing an account for an organization via an online facility. For example, some embodiments of the invention may use a paper sign-up form to allow an organization to request that an account be established. An example paper sign-up form is shown in FIG. 3. As can be seen in FIG. 3, a paper form may enable an organization to specify a name for the account, one or more sub-accounts (example uses for which are described below) an administrator for the account, a designee to receive distributions of recycling proceeds via check, and. A paper form may also allow the organization to designate an address to which receptacles to be distributed to donors may be sent. Like the example online facility 200 shown in FIG. 2, the example paper form shown in FIG. 3 is merely illustrative with regard to the types of information it is designed to collect. Any suitable information may be collected, as embodiments of the invention are not limited in this respect. Further, the invention is not limited to using either an online or paper-based sign-up form. Any suitable technique may be employed to collect information relating to an organization that may be useful in establishing an account for the organization. For example, information may be collected by an administrator over the telephone.

When act 110 of example process 100 (FIG. 1) is completed (e.g., when the paper form shown in FIG. 3 is submitted, a user of example online facility 200 clicks button 280, etc.), example process 100 proceeds to act 120, wherein an account establishment request is received. If an online form is submitted, an administrator engaged by the operator of example facility 200 may receive the request.

Example process 100 then proceeds to act 130, wherein the requested account is established. In embodiments in which account records are maintained electronically, establishing the account may include adding one or more records to an electronic storage facility, such as a database like that which is described in commonly assigned co-pending U.S. patent application Ser. No. 11/336,359, entitled "Techniques for Managing Information Related to Recyclable Containers," filed Jan. 20, 2006, which is incorporated herein by reference in its entirety. Establishing the account may, in some embodiments, include assigning a unique identifier to the account, which may thereafter be used to reference it (e.g., by donors, the organization's representative(s), etc.). Of course, an account identifier may be assigned in any suitable way, and need not be unique, as embodiments of the invention are not limited to being implemented in any particular manner.

In act 140, a set of receptacles is provided to the organization. This may be performed, for example, by delivering the set of receptacles by U.S. mail, in person, or using any other suitable technique(s). In some embodiments, each receptacle is designed to collect recyclable containers for beverages consumed by a donor. A set of receptacles may comprise any suitable quantity. Providing a set of receptacles to the organization may, for example, allow the organization to hand out each receptacle in the set to a potential donor as part of promoting its fundraising efforts.

In some embodiments, each receptacle in the set may include information enabling the organization's account to be identified, so that when the receptacle is later dropped off filled with containers, the value to be provided in exchange for the containers may be deposited into the account. For example, in some embodiments of the invention, an identifier (e.g., a numeric identifier) for the account may be included with the receptacle. Of course, embodiments of the invention are not limited to employing an identifier. Any suitable information which allows the organization's account to be discerned may be employed. For example, the organization's name may be included with the receptacle.

Figure 4:
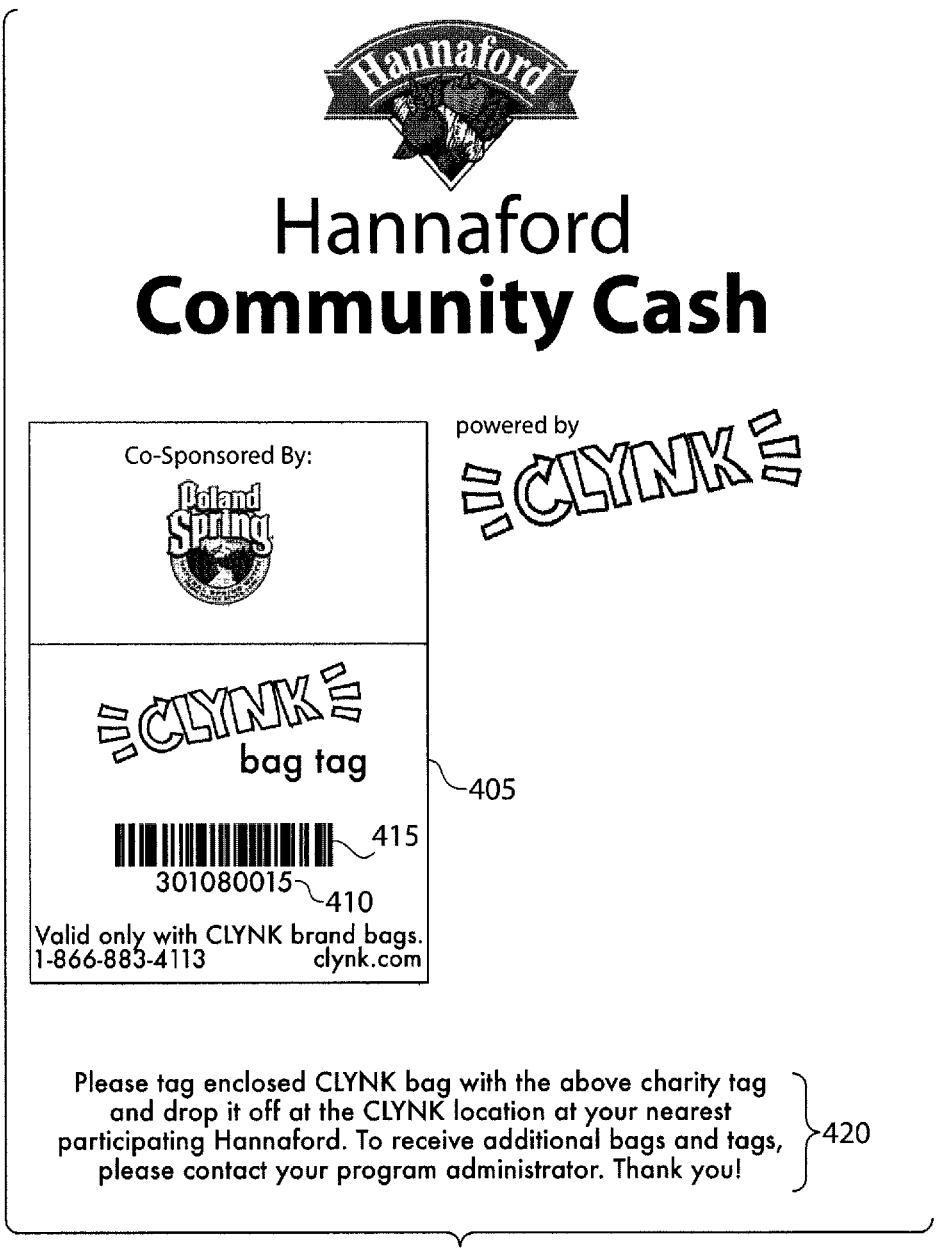
FIG. 4 is a reproduction of a tag which may be affixed to a receptacle used to collect recyclable containers, in accordance with some embodiments of the invention.

Information usable to identify the organization's account may be included with a receptacle in any of numerous ways. For example, in some embodiments, each receptacle in the set may be provided to a donor in an envelope to which is attached a tag which includes the information, with instructions to the donor to affix the tag to the receptacle prior to drop-off, so that the account may be identified. FIG. 4 depicts example instructions 420 and a tag 405 to be affixed to a receptacle. In this example, instructions 420 indicate that the tag 405 is to be affixed to the receptacle prior to it being brought to a return center. Also in this example, the numeric account identifier 410 is represented via a bar code 415, so that the account may be identifiable by an operator employing a barcode scanner. It should be appreciated that any suitable technique for representing an identifier (or other identifying information) may be employed, as embodiments of the invention are not limited in this respect. It should further be appreciated that information enabling an organization's account to be identified may be associated with a receptacle in any suitable fashion. For example, an identifier may be printed, hand-written, embossed, tagged or otherwise applied to a receptacle. Embodiments of the invention are not limited to any particular implementation.

Example process 100 then proceeds to act 150, wherein receptacles containing recyclable containers are received from various donors to which the organization distributed them, and then to act 160, wherein the containers are processed. Receipt of receptacles and/or processing of recyclable containers may be performed in any of numerous ways. For example, a receptacle may be received and processed at a return center, one example of which is described in commonly assigned co-pending U.S. patent application Ser. No. 11/725,698, entitled "Techniques for Processing Recyclable Containers," filed Mar. 20, 2007, which is incorporated herein by reference in its entirety. This co-pending application discloses techniques whereby received recyclable containers may be received, identified, sorted and densified for transport, and a value to be provided in exchange for received containers may be determined. Of course, embodiments of the invention are not limited to employing any of the techniques described in this co-pending application to receive a receptacle and/or process recyclable containers to determine a value to be provided in exchange for them, as any of numerous other techniques may be employed.

Example process 100 then continues with act 170, wherein a value corresponding to returned recyclable containers is transferred to the account established for the organization. Transfer may be accomplished using any suitable technique. For example, above-referenced co-pending U.S. patent application Ser. No. 11/725,698 discloses some example techniques for transferring amounts to accounts. In some embodiments, a transaction may be applied to an account for each receptacle storing recyclable containers that is returned by a donor, for the value determined in act 160. However, embodiments of the invention are not limited to applying each separate recycling transaction to an account, as amounts may be aggregated, or otherwise applied at any suitable level of detail.

Example process 100 then proceeds to act 180, wherein a facility is provided which enables monitoring of activity relating to the account. This facility may take any of numerous forms. One example, shown in FIG. 5, depicts a screen shot of an example display provided by an online facility. As can be seen from the example shown, an online facility may display information such as the total balance in the account (505) and the last distribution paid from the account (510). In some embodiments, access to an online facility may be restricted, such as via the provision of a PIN issued to a representative of the organization, so that unauthorized individuals may not be able to gain access to information provided by the facility. Of course, a facility provided to enable monitoring of activity relating to an account need not be online. Any suitable information delivery and/or presentation vehicle may be employed.

The example facility shown in FIG. 5 also illustrates a feature noted above that is provided by some embodiments of the invention. Specifically, the example display shown indicates that an account may, in some embodiments, comprise one or more sub-accounts, and that amounts directed to each sub-account may be individually monitored (as indicated at 515).

Allowing an account to include multiple sub-accounts may confer various benefits. For example, if an organization undertaking fundraising efforts comprises multiple groups, then each group may be assigned a sub-account of the overall account held by the organization. This may enable each group's contribution to the total amount raised by the organization to be monitored and compared to the contribution made by other groups in the organization. Because the contribution of each group may be tracked separately, the organization may, for example, foster competition between groups, which may encourage the members of each group to urge donors to recycle (thereby benefiting society as a whole), thus generating more donations, and increasing the total amount raised by the organization. For example, to support a fundraising competition between schools, an overall account may be established for the competition, and each participant school may have its own sub-account. The amount raised by each school may be compared against amounts raised by other schools, encouraging each school to urge donors to recycle, which may increase the amount donated by each donor, thereby increasing the total amount raised during the competition. In some embodiments, a "bonus" or other award may be provided to the winning school, providing further encouragement to actively solicit donations.

In some embodiments, a sub-account may itself have multiple sub-sub-accounts. Thus, continuing with the example above, the sub-account for each participant school may include multiple sub-sub-accounts, each assigned to a different student group (e.g., class, team, etc.) at the school. Proceeds from recycling activity may be tracked at the level of sub-sub accounts, sub-accounts and the overall account, so that each group may track its contribution to the organization's total relative to the contribution of other groups.

Figure 6:
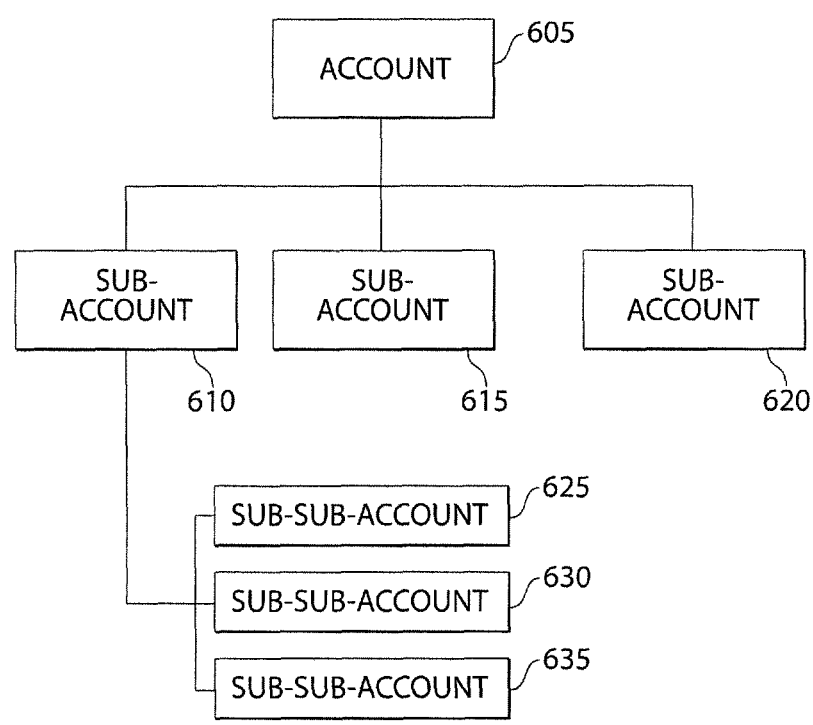
FIG. 6 is a block diagram depicting conceptually a relationship between accounts and sub-accounts, in accordance with some embodiments of the invention.

An example account structure is depicted conceptually in FIG. 6. In the example shown, account 605 includes sub-accounts 610, 615 and 620, and sub-account 610 includes sub-sub accounts 625, 630 and 635. Of course, an account or sub-account may include any suitable number of underlying sub-accounts or sub-sub-accounts, including a number which is less than or greater than the three shown in FIG. 6. Further, any account, at any level in the structure shown in FIG. 6, may include any suitable number of underlying accounts, enabling proceeds from recycling activity to be tracked at any suitable level of granularity.

It should be appreciated that the invention is not limited to an account being established by the organization that will benefit from it. For example, a first organization may establish an account for a second organization, with any recycling proceeds that are collected in the account being distributed to the second organization for its benefit. As an example, a transfer station seeking to limit the amount of recyclable containers dropped off for disposal may establish an account to collect scholarship funds for use by selected students at a local high school. Visitors to the transfer station may be encouraged to place their recyclable containers into one or more receptacles identifying the scholarship fund's account rather than simply throwing the containers away. Any redemption deposits payable for the containers collected may be directed to the scholarship fund's account. All parties to this arrangement may benefit. For example, the transfer station may benefit because it may be perceived by members of the community as philanthropic. Students to which scholarship funds are made available may benefit not only from those funds becoming available, but also because they may have added incentive to apply themselves in the classroom (e.g., if their eligibility for the funds were conditioned on academic performance). Consumers may benefit from the knowledge that their recycling activities contributed to students advancing their education.

Figure 7:
FIG. 7 is a reproduction of an example statement of donation activity which may be distributed to an organization, in accordance with some embodiments of the invention.

Example process 100 (FIG. 1) then proceeds to act 190, wherein a statement is issued (e.g., periodically) to the organization. A statement may include any suitable information, provided at any suitable level of detail. An example statement 700 is shown in FIG. 7, in which amounts applied to an organization's account during a defined period of time (i.e., Dec. 1, 2010 to Mar. 31, 2011) are shown. In example statement 700, line item 710 indicates that the example account had a beginning balance of $62.05 on Nov. 30, 2010. Line item 720 indicates that one hundred receptacles ("Community Cash Bags") were sent to the account's designated representative on Jan. 3, 2011, resulting in a charge of $13 being applied to the account.

Line item 730 indicates that a "Community Cash Gift" (described further below) of $65.50 was applied to the account on Jan. 25, 2011. In this respect, some embodiments of the invention may enable a donor to direct proceeds from recycling activity to an organization without having first been given a collection receptacle by the organization. For example, in some embodiments, an organization's establishment of an account may cause that account to be identified to other account holders (e.g., via an online facility), and allow those account holders to specify that some or all of the proceeds from their individual recycling activity be provided to the organization, rather than to them. This may enable an organization to further increase the effectiveness of its fundraising efforts, and also encourage recycling by donors.

Figure 8:
FIG. 8 is a screenshot representation of a facility enabling an account holder to direct proceeds from recycling activity to an organization, in accordance with some embodiments of the invention.

An example online facility 800 that enables other account holders to specify that some or all of the proceeds from their individual recycling activity is to be provided to an organization, rather than to them, is shown in FIG. 8. Example online facility 800 includes balance indication 805, which indicates to the account holder the proceeds from his/her individual recycling activity held in the account. Text portion 810 indicates to the account holder that, rather than having the balance indicated at 805 be provided (e.g., paid) to them, they may direct all or a portion of the balance to an organization for which an account has been established. If the account holder wishes to do so, he/she may click button 815 to identify an organization to which proceeds should be directed. In the example shown, clicking button 815 causes example online facility 900, shown in FIG. 9, to be presented to the account holder. Example online facility 900 includes box 905, which allows the account holder to input a keyword (e.g., an organization name and/or other identifier) which the account holder wishes to locate. By clicking on button 910, the account holder may initiate a search based on the keyword(s) submitted, and cause matching organizations to be identified.

Figure 9:
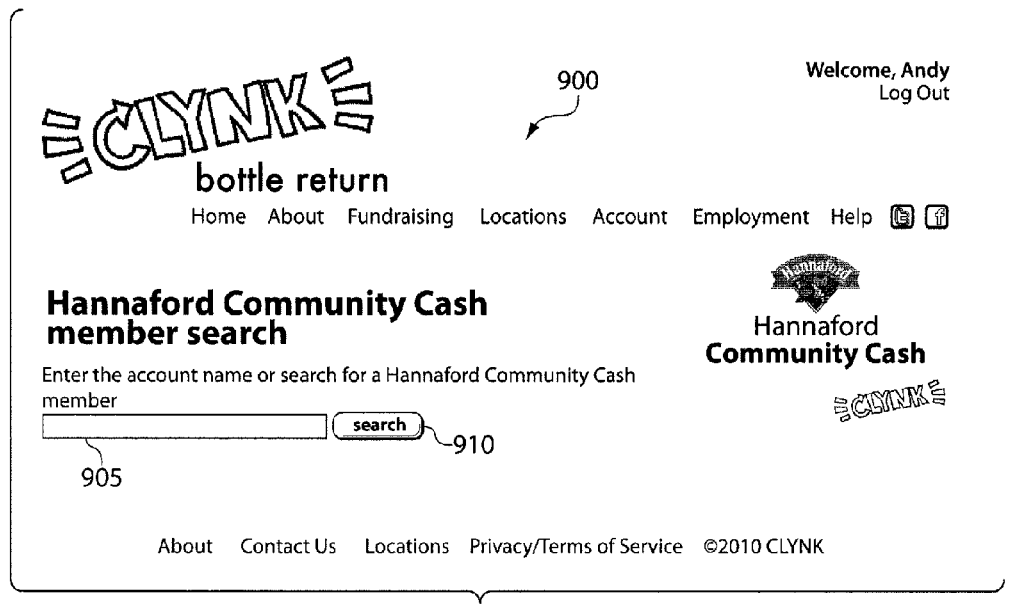
FIG. 9 is a screenshot representation of a facility enabling an account holder to search for an organization to which proceeds from recycling activity are to be directed.

It should be appreciated that the example online facilities shown in FIGS. 8 and 9 enable only one way of locating organizations to which an account holder may direct proceeds from recycling activity, and that numerous other ways are possible. For example, an account holder need not perform a search for organizations to which to direct recycling proceeds. For example, an online facility may instead present a list of all of the organizations to which he/she may direct recycling proceeds, and the account holder may select one or more to which proceeds are to be directed. Embodiments of the invention are not limited to any particular implementation.

Referring again to the example statement shown in FIG. 7, line item 740 indicates that thirty-four receptacles were received and processed during the time period ending Mar. 31, 2011, resulting in a credit of $128.000 being applied to the account. Line item 750 indicates that an administrative fee ("Community Cash Plan fee") of $4.95 was charged to the account on Apr. 1, 2011, leaving a balance of $237.60, which line item 560 indicates was disbursed by check on Apr. 1, 2011. It should be appreciated that the transactions, amounts and level of detail depicted in example statement 700 are for illustration purposes only, and that any suitable information, at any level of detail, may alternatively be shown in a statement issued periodically to describe activity on an account. Embodiments of the invention are not limited in this respect.

It should also be appreciated that issuing periodic statements which detail activity relating to an organization's account may provide advantages over conventional arrangements, in that embodiments of the invention may enable activity to be verified by interested parties. In this respect, in some conventional arrangements, an organization may entrust one or more individuals with collecting donations on the organization's behalf. The organization may not know exactly how much in donations the individual collected, when those donations were collected, and whether the full amount he/she collected was remitted to the organization. By providing periodic statements that detail the activity relating to an account, embodiments of the invention enable interested parties to verify that all donations collected are forwarded to the organization.

Example process 100 then proceeds to act 195, wherein a distribution is made from the account. In some embodiments, a check or other method of payment may be sent (e.g., mailed) to a nominated representative of the organization. For example, if example online facility 200 was used to establish the account, and a treasurer for the organization was named in fields 210 and 215, then a check may be mailed to that person. In some embodiments, a distribution may be made periodically, such as at or around the time a statement is issued (e.g., as described above with reference to act 180), so that the amount that is distributed is the same as that which is shown on the statement (e.g., on line 560 of example statement 500). Of course, embodiments of the invention are not limited to such an implementation, as distributions may be made at any desired frequency (e.g., periodicity), which may or may not correspond to a fixed period of time passing and/or the issuance of statements. Any suitable distribution schedule may be employed. For example, rather than being performed at set intervals, distributions may be made when the amount held in the account reaches a certain threshold amount. Further, any suitable payment method may be employed. For example, in some embodiments, an organization may nominate an account that is separate from that to which recycling proceeds are deposited, and an electronic transfer may periodically be initiated to that account. Embodiments of the invention may be implemented in any of numerous ways.

At the completion of act 195, example process 100 completes. It should be appreciated that numerous variations on example process 100 are possible. For example, variations on example process may include acts not described above, omit one or more of the acts described above, provide for one or more acts to be performed differently than in the manner(s) described above, and/or provide for acts described above to be performed in a different sequence than that which is described herein. In but one example, some embodiments of the invention may provide for donors collecting recyclable containers for an organization's benefit without being given a receptacle in which to store the containers, as is described above. In these embodiments, donors may use, for example, their own personal receptacles to store the containers, and (for example) be asked to identify the organization when bringing their containers, such as by verbally identifying the organization to an attendant at a return center. Any of numerous other variations on example process 100 may be implemented, as embodiments of the invention are not limited in this respect.

Figure 10:
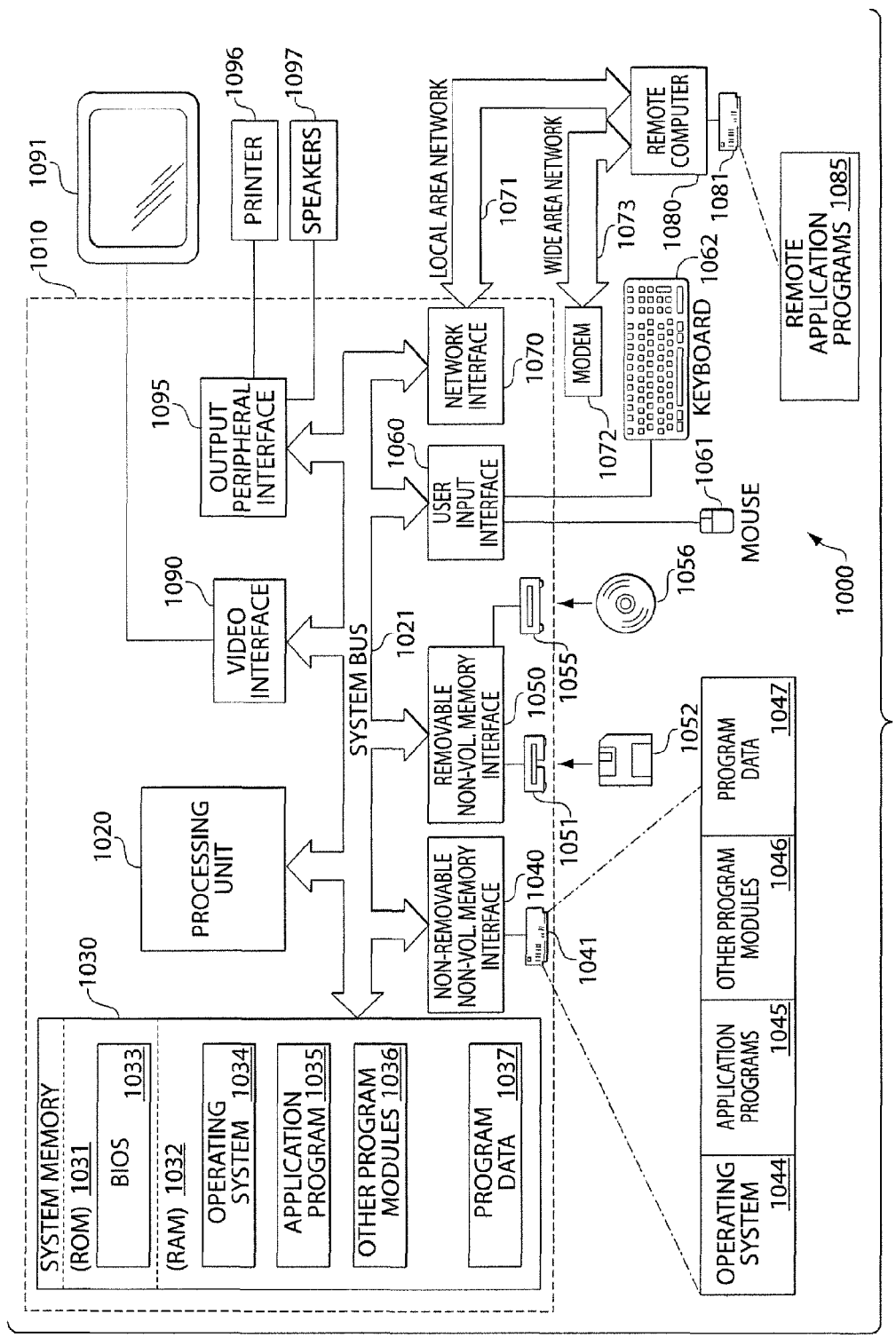
FIG. 10 is a block diagram depicting an example computer system on which aspects of embodiments of the invention may be implemented.

As should be appreciated from the description above, various aspects of the invention may be implemented via one or more computer systems, such as the exemplary system 1000 shown in FIG. 10. FIG. 10 illustrates an example of a suitable computing system environment 1000 on which the invention may be implemented. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment 1000.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 10, an exemplary system for implementing the invention includes a general purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through an non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information into the computer 1010 through input devices such as a keyboard 1062 and pointing device 1061, commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through a output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

It should also be appreciated that the above-described embodiments of the invention may be implemented in any of numerous ways. For example, the above-discussed functionality may be implemented using software, hardware or a combination thereof. When implemented in software, the software code can be executed on any suitable processor or collection of processors, whether provided in a single computer or distributed among multiple computers. It should further be appreciated that any component or collection of components that perform the function as described herein may generically be considered as one or more controllers that control the above-described function. The one or more controllers may be implemented in numerous, such as with dedicated hardware, or by employing one or more processors which are programmed using microcode or software to perform the functions recited above. Where a controller stores or provides information for system operation, such information may be stored in a central repository, in a plurality of repositories, or a combination thereof.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for encouraging recycling, comprising acts of:
providing to an organization a plurality of receptacles for distribution to a plurality of donors, at least first and second receptacles of the plurality of receptacles including information enabling an account associated with the organization to be identified;

receiving the first receptacle of the plurality of receptacles from a first donor of the plurality of donors, the first receptacle having at least one first recyclable container;

receiving the second receptacle of the plurality of receptacles from a second donor of the plurality of donors, the second receptacle having at least one second recyclable container;

using a processing machine to process the first and second receptacles after receipt from the first and second donors, respectively, to determine from each of the first and second receptacles the organization to which the plurality of receptacles was provided;

processing the at least one first recyclable container and the at least one second recyclable container after receipt, the processing comprising determining a value to be provided in exchange for the at least one first recyclable container and the at least one second recyclable container; and depositing into the account the value determined to be provided in exchange for the at least one first recyclable container and the at least one second recyclable container.

2. The method of claim 1, further comprising, prior to providing to the organization the plurality of receptacles, providing an online facility enabling a representative of the organization to request that the account be established and establishing the account for the organization at the request of the organization.

3. The method of claim 1, wherein the organization includes a plurality of groups, and wherein the information enabling the account associated with the organization to be identified enables at least one sub-account associated with the account to be identified, the at least one sub-account corresponding to a group of the plurality of groups.

4. The method of claim 1, wherein providing to the organization the plurality of receptacles comprises providing each receptacle of the plurality of receptacles with an identifier identifying the account associated with the organization.

5. The method of claim 1, wherein the first receptacle is a bag.

6. The method of claim 1, wherein the information enabling the account to be identified comprises an identifier of the account.

7. The method of claim 6, wherein the identifier is printed on a tag.

8. The method of claim 1, further comprising issuing a statement to the organization providing information on activity relating to the account.

9. The method of claim 1, further comprising distributing value held in the account to the organization.

10. The method of claim 9, wherein distributing value held in the account to the organization comprises making a periodic distribution.

11. The method of claim 9, wherein distributing value held in the account to the organization comprises issuing a distribution to a nominated representative of the organization.

12. The method of claim 1, further comprising an providing a facility enabling the organization to monitor activity relating to the account.

13. The method of claim 1, wherein the first donor and second donor do not receive any of the value.

14. The method of claim 1, wherein the processing machine comprises a scanner.

15. The method of claim 14, wherein the processing machine comprises a handheld scanner.

16. The method of claim 1, wherein processing the at least one first recyclable container and the at least one second recyclable container comprises scanning the at least one first recyclable container and the at least one second recyclable container with a scanner to determine the value to be provided in exchange for the at least one first recyclable container and the at least one second recyclable container.

17. The method of claim 16, wherein the scanner is a handheld scanner.

18. A method, comprising:

providing to an organization a plurality of receptacles for distribution to a plurality of donors;

providing to the organization a plurality of tags including information enabling an account associated with the organization to be identified, the plurality of tags being configured to be coupled to the plurality of receptacles;

receiving a first receptacle of the plurality of receptacles and a first tag of the plurality of tags from a first donor of the plurality of donors, the first receptacle having at least one first recyclable container and the first tag being coupled to the first receptacle;

receiving a second receptacle of the plurality of receptacles and a second tag of the plurality of tags from a second donor of the plurality of donors, the second receptacle having at least one second recyclable container and the second tag being coupled to the second receptacle;

using a processing machine to process the first and second tags after receipt from the first and second donors, respectively, to determine from each of the first and second tags the organization to which the plurality of tags was provided;

processing the at least one first recyclable container and the at least one second recyclable container after receipt, the processing comprising determining a value to be provided in exchange for the at least one first recyclable container and the at least one second recyclable container; and depositing the value into the account.

19. The method of claim 18, wherein the plurality of receptacles comprises a plurality of bags.

20. The method of claim 18, wherein the processing machine comprises a scanner.

21. The method of claim 20, wherein the processing machine comprises a handheld scanner.

22. The method of claim 18, wherein processing the at least one first recyclable container and the at least one second recyclable container comprises scanning the at least one first recyclable container and the at least one second recyclable container with a scanner to determine the value to be provided in exchange for the at least one first recyclable container and the at least one second recyclable container.

23. The method of claim 22, wherein the scanner is a handheld scanner.

* * * * *

UNITED STATES PATENT AND TRADEMARK OFFICE
CERTIFICATE OF CORRECTION

| | | |
|---|---|---|
| PATENT NO. | : 8,630,944 B2 | Page 1 of 1 |
| APPLICATION NO. | : 13/192899 | |
| DATED | : January 14, 2014 | |
| INVENTOR(S) | : Mayo et al. | |

It is certified that error appears in the above-identified patent and that said Letters Patent is hereby corrected as shown below:

On the title page, Item [73], delete "MA" and replace it with --ME--;

In the claims:

Claim 1, column 12, line 62, delete "comprising acts of" and replace it with --comprising--.

Claim 12, column 13, line 58, delete "comprising an providing" and replace it with --comprising providing--.

Signed and Sealed this
Sixteenth Day of September, 2014

Michelle K. Lee
*Deputy Director of the United States Patent and Trademark Office*